United States Patent [19]
Bortolin et al.

[11] Patent Number: 5,093,881
[45] Date of Patent: Mar. 3, 1992

[54] CONNECTOR FOR INTERCONNECTING OPTICAL FIBER CABLE RIBBONS

[75] Inventors: Bruno Bortolin, Cinisello Balsamo; Paolo Boero, Milan, both of Italy

[73] Assignee: Societa' Cavi Pirelli S.p.A., Milan, Italy

[21] Appl. No.: 596,783

[22] Filed: Oct. 12, 1990

[30] Foreign Application Priority Data

Oct. 17, 1989 [IT] Italy .............................. 22040 A/89

[51] Int. Cl.⁵ ............................................. G02B 6/36
[52] U.S. Cl. .................................................. 385/114
[58] Field of Search .......................... 350/96.20-96.23

[56] References Cited

U.S. PATENT DOCUMENTS

| | | | |
|---|---|---|---|
| 4,009,931 | 3/1977 | Malsby et al. | 350/96.22 |
| 4,140,366 | 2/1979 | Makuch et al. | 350/96.22 |
| 4,279,469 | 7/1981 | Forman | 350/96.22 |
| 4,320,938 | 3/1982 | Gunnersen | 385/88 |
| 4,708,433 | 11/1987 | Kakii et al. | 350/96.22 |

FOREIGN PATENT DOCUMENTS

| | | |
|---|---|---|
| 0253426 | 1/1988 | European Pat. Off. |
| 0324272 | 7/1989 | European Pat. Off. |
| 2007867 | 5/1979 | United Kingdom |

OTHER PUBLICATIONS

"Field-Installable Plastic Multifiber Connector" by Yasuhiro et al., Journal of Lightwave Technology, vol. LT4, No. 8 Aug. 1986.

*Primary Examiner*—Akm Ullah
*Attorney, Agent, or Firm*—Brooks Haidt Haffner & Delahunty

[57] ABSTRACT

A pair of interengageable connectors for interconnecting optical fiber tape or ribbon cables which have a plurality of parallel optical fibers within a relatively thin and wide covering. Each connector has a ferrule formed by semicylindrical elements with engaging and axially extending planar faces. One end of the elements is a coupling face, and the planar faces have grooves extending axially from the coupling face for receiving the fibers with the covering removed and a recess remote from the coupling face for receiving the fibers with the covering thereon. The elements are held together by a sleeve which extends from at or adjacent the coupling face toward the other end of the ferrule. A ring nut with teeth for engaging corresponding teeth of the other connector encircles the sleeve and the ferrule and is slidable axially with respect thereto. A spring urges the ring nut toward the end of the ferrule remote from the coupling face. The assembled elements have axially extending holes receiving alignment pins.

14 Claims, 2 Drawing Sheets

CONNECTOR FOR INTERCONNECTING OPTICAL FIBER CABLE RIBBONS

FIELD OF THE INVENTION

The present invention relates to connectors for interconnecting optical fibers in tapes or ribbons.

BACKGROUND OF THE INVENTION

In order to link together two optical cables of the type known as "tape" or "ribbon" cables and which include a plurality of optical fibers arranged in parallel and secured together by a single coating made of plastic material, it is necessary to arrange each optical fiber of one of the cables in alignment with the corresponding fiber of the other cable in order to allow the light passage from one fiber to another, thereby minimizing the dispersion and the attenuation of the transmitted signal caused by misalignment defects of the fibers.

To obtain this alignment, simultaneously, for all the fibers in the tape or ribbon, the end of the tape is inserted in a rigid body, called a connector, which maintains the fibers in a geometrically fixed position. A pair of connectors, secured to the respective ends of tapes, the fibers of which are to be optically joined, are therefore arranged and kept in a faced and aligned position, so that the respective fibers can be correctly arranged in order to form the optical connection.

Connectors of the kind described are known. Each of them comprises a pair of small plates having several grooves, and in these grooves, the fibers are housed, and other grooves receive aligning means. The small plates are held together by means of resilient clips or adhesive, and the pair of small plates, fixed at the end of respective cables, is contained in an outer envelope which comprises axial tightening means for the pair of small plates for carrying out the optical connection between the fibers.

Alternatively, the small plates, secured to the end of a cable, are inserted in an envelope, to form a connector linkable, by axial tightening means, with a similar connector of a second cable.

Connectors comprising monolithic elements made of plastic material or similar materials are also known. These elements have holes in which the fibers of a tape can be housed, and in turn, said elements also have to be housed in outer envelopes and tightened by resilient clips or by similar means for the optical coupling.

The connector of the known embodiments is formed by a large number of components and the application of the connector to an optical fiber tape, which can be carried out in the field during the installation or the servicing of optical fiber tape, is therefore very complex, due to the brittleness of the fibers and the required precision for the optical coupling.

Connecting groups carried out according to the known embodiments, are also very encumbering, both in the axial and in the transverse direction, and often they need the use of additional elements which further increase the complexity and the encumbrance of the connection.

BRIEF SUMMARY OF THE INVENTION

One object of the present invention is to provide a connector assembly for optical fiber tapes or ribbons which can be carried out with the required characteristics of precision and which can be applied to a tape or ribbon with simple and quickly performed operations because it is formed by a small number of pieces and which also is of a small size and is only a small encumbrance.

A further object of the present invention is to provide a separable connector assembly for optical fibers in a tape or ribbon which comprises two connectors secured to the ends of respective tapes of optical fibers, said tapes comprising at least two parallel optical fibers contained in a single outer coating, each connector being provided with a face coupling with the face of the other connector and the ends of the optical fibers of the respective tapes are at said coupling faces. Each connector comprises a pair of generally semi-cylindrical ferrule elements, said elements being coupled together at their respective facing axial planes and between which an end of the optical fiber tape is disposed. The fibers are partially stripped of their common coating and are at one end of the ferrules, said end forming the coupling face of the connector. Said ferrules are surrounded by a sleeve that axially extends for a certain length, usually from said coupling face, and said sleeve is force fitted on the ferrules. The ferrules are also provided with grooves for receiving one or more alignment pins, and said pins are insertable in corresponding grooves of a facing connector. The ferrules are surrounded by an axially slidable, annular ring nut, said ring nut being provided at its end adjacent the coupling face with restraining means and said restraining means being engageable with corresponding restraining means of the ring nut of the facing connector. Resilient means are interposed between the sleeve and the ring nut, said resilient means acting in the direction away from said coupling face and said resilient means being in a compressed condition when the ring nuts of the two coupled connectors are engaged together thereby pressing the coupling faces of the connectors against each other.

In more detail, each ferrule element has several longitudinal grooves on its axial flat surface, and said grooves are suited for partially housing the tape fibers stripped of the common plastic coating.

The ends of said fibers are at the end faces of the ferrules forming the coupling face. The ferrules also house a part of the optical fiber tape which is adjacent to the portions of the optical fibers stripped of the common coating, and generally, each ferrule element houses half of the thickness of the coating. Two ferrule elements are coupled with their respective axial planes in contact and receive the fibers in cavities defined by respective grooves generally without clearance.

One or more alignment pins of a connector are force fitted in respective grooves of a ferrule element and between them and the sleeve encircling the ferrule elements. The grooves for receiving one or more alignment pins are arranged in a diametral plane perpendicular to the axial flat surface of the ferrule elements. Alternatively, the grooves for receiving one or more alignment pins are arranged on the axial flat surface of the ferrule elements.

Preferably, each connector comprises two grooves for the alignment pins, and more than a half of the length of a pin is inserted in the grooves of one of the connectors.

Preferably, adhesive is inserted in the recess housing the coated part of tape of the optical fibers and also in the groove housing the pin. The ferrules are provided with one or more holes for the introduction of adhesive in the recess housing the fiber tape and in the groove housing the alignment pin.

Preferably, the resilient means interposed between the sleeve and the ring nut is a helical spring surrounding the ferrules.

Restraining means for the ring nuts are formed by a plurality of axially projecting teeth having undercuts engageable with corresponding coupling parts of the ring nut of a facing connector.

Preferably, the ferrules are made by pressing with dimensionally stable plastic material, and the sleeve is made of a metallic material.

If desired, the sleeve can be inserted on the coupled ferrule elements with an end which is axially spaced by a small amount with respect to the coupling faces of the ferrules, the length of the spacing being larger than the thickness of the material taken away by the lapping which is used to finish the coupling faces and the optical fiber ends.

BRIEF DESCRIPTION OF THE DRAWINGS

Other objects and advantages of the present invention will be apparent from the following detailed description of the presently preferred embodiments thereof, which description should be considered in conjunction with the accompanying drawings in which:

As shown in FIGS. 1 to 5, a connecting assembly for two optical fiber tapes or ribbons 1, 2 according to the present invention comprises, at the end of each tape or ribbon, respective connectors 3a, 3b including ferrules 4 each formed by a pair of ferrule elements 4a, 4b for housing the fibers. The optical fibers are tightened in position between said elements, and a sleeve 5 is arranged around each pair of elements 4a and 4b, said sleeve 5 keeping the ferrules in engagement and aligned in their respective frontal zones.

Figure 1:
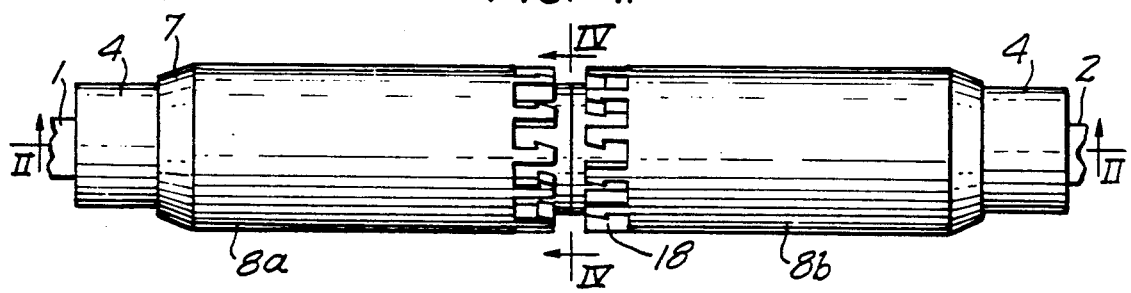
FIG. 1 is a side view of the connecting assembly in which the ring nuts for the mutual locking of the connectors are not engaged.

A resilient element 6 bears against a rear end 5a of the sleeve 5, said resilient element 6 having the form of a helical spring which acts, at its opposite end, against a face of the annular bottom 7 of a ring nut 8a or 8b which surrounds the elements 4a and 4b and can axially slide on the ferrules formed by the elements 4a and 4b. A shoulder 9 on the ferrules form means for stopping the sliding of the ring nuts 8a and 8b under the action of the springs 6.

Figure 5:
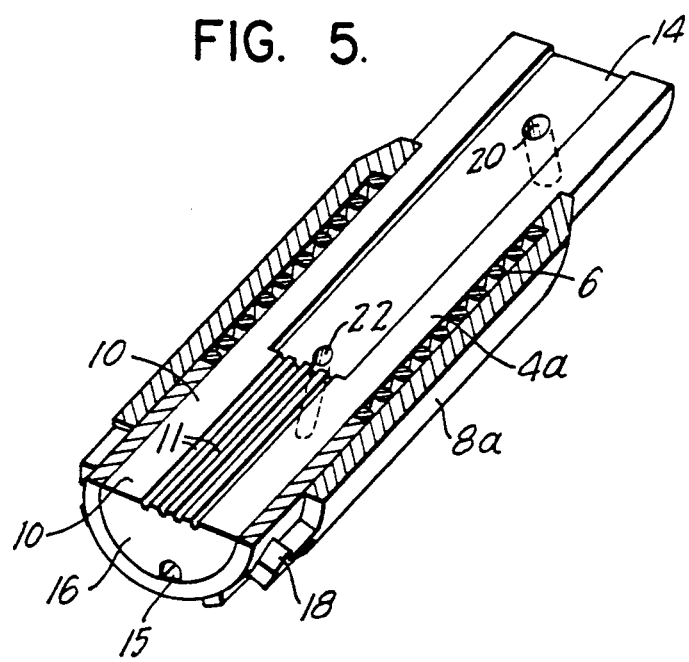
FIG. 5 is a perspective sectional view taken along the line III—III in FIG. 2, without the optical fiber tape.
Figure 6:
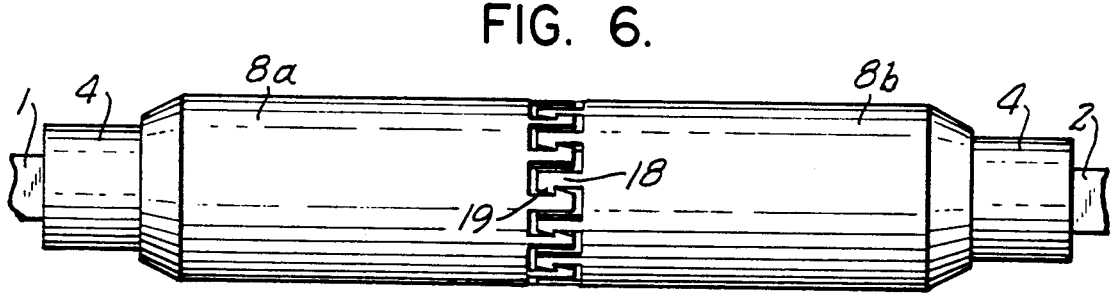
FIG. 6 is an enlarged side view showing the connecting assembly of FIG. 1, with the ring nuts interengaged.

Each ferrule element 4a and 4b, as it can be best seen in FIG. 5, is formed by a generally semi-cylindrical element, on the axially extending flat surface 10 of which there are several grooves 11, suitable for housing, with great precision, the ends of the optical fibers 12 of a tape or ribbon of optical fibers, the end portions of the fibers 12 being stripped of their common outer coating 13 (see FIGS. 2 and 3) made of plastic material. A portion of the tape with the plastic coating 13 is housed in a recess 14 arranged in a rear zone of the ferrule.

The ferrule elements 4a, 4b are also provided, in a plane perpendicular to the surface 10, with grooves 15 extending for a part of the length of an element starting from a front surface 16. Pins 17 are housed in the grooves 15, and said pins 17 are pressed against the bottom of the respective grooves 15 by the sleeve 5.

Figure 2:
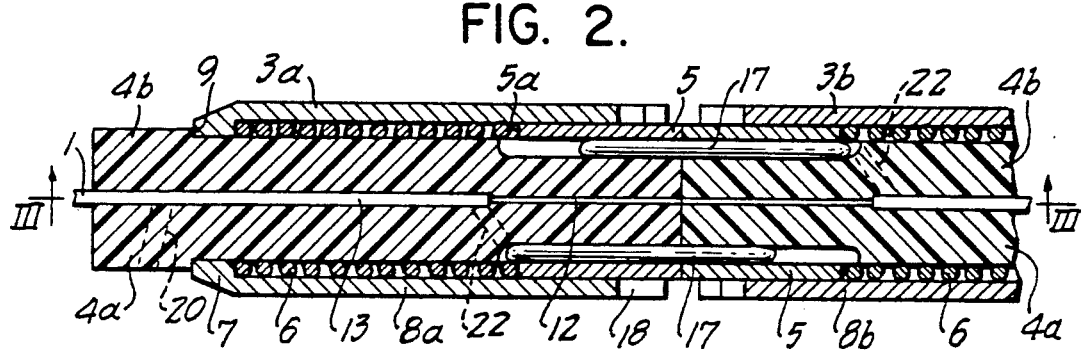
FIG. 2 is an enlarged axial section taken along the line II—II in FIG. 1.
Figure 3:
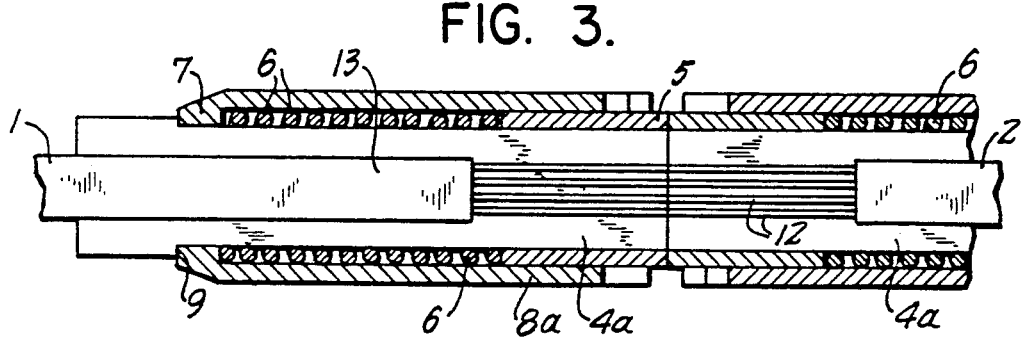
FIG. 3 is a section taken along the line III-III in FIG. 2.
Figure 4:
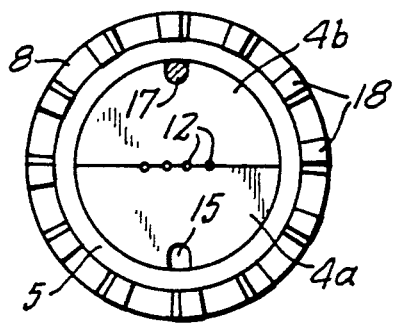
FIG. 4 is a cross-sectional view taken along the line IV—IV in FIG. 1.

As shown in FIG. 2, preferably, one of the ferrules 4, of a connector, has a pin 17 housed in the bottom of a groove 15 thereof, while the mating groove 15 in the other ferrule 4 is without a pin 17 in order to allow the insertion into said latter groove of the corresponding pin housed in the other ferrule.

Figure 8:
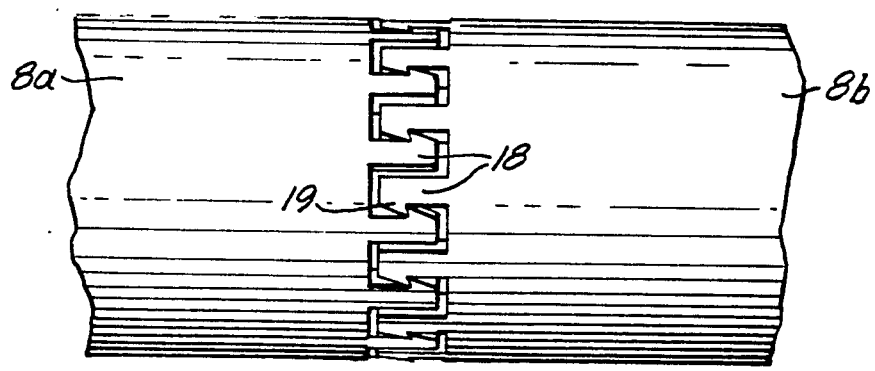
FIG. 8 is a fragmentary, enlarged side view showing the teeth of the connectors in greater detail.

The ring nut 8a or 8b has one end at the front face 16 of the corresponding connector, shaped with a profile provided of restraining teeth 18. Said teeth 18 are adapted to engage with corresponding restraining teeth of the ring nut of the other connector disposed in facing relation to said ring nut 8a. The enlarged configuration of the teeth 18, shown in FIG. 8, shows an undercut 19, and said configuration allows the interengagement of the teeth 18 of opposite ring nuts 8a and 8b after an axial insertion and a rotation for coupling the teeth 19 together. Said teeth are kept in a tightened condition due to the action of the springs 6 thereby ensuring the desired contact pressure between the surfaces 16 of the connectors facing each other.

The configuration exhibited by the restraining teeth 18 is to be considered only by way of example. In fact, many other alternative configurations are possible, such as a joint formed by rotating parts, a bayonet joint or a joint employing elastic deformation of parts.

The structure according to the invention allows a particularly simple assembling operation of the connector to the end of the optical cable. For this reason, the end of an optical fiber tape or ribbon is stripped of its corresponding coating 13 made of plastic material for a predetermined length leaving a length of the fibers 12 uncovered. The same fibers are then placed inside the grooves 11 of a ferrule element 4a, while a part of the tape is placed in a recess 14 of the same element.

The grooves 11 and the recess 14 are dimensioned so as to house the optical fibers 12 and the tape 1 or 2 for half of their thickness respectively. A second ferrule element 4b is therefore arranged on the element 4a, surrounding the fibers and a portion of the end of the tape.

Adhesive introduced in the recess 14 before joining the two ferrule elements 4a, 4b, or alternatively, fed through a hole 20, (see FIG. 2) or similar holes extending to the recess 14 secures the fiber tape internally locked in its housing without exerting unacceptable mechanical stresses on the fibers.

After having joined the two ferrule elements 4a and 4b which form a ferrule 4 that is generally cylindrical, a ring nut 8a or 8b is applied over the ferrule. Said ring nut 8a or 8b is able to slide until it rests against the shoulder 9. Thereafter, the spring 6 is arranged to rest against the annular bottom 7 of the ring nut, and then, the sleeve 5 is force fitted on the front part of the joined ferrule elements 4a and 4b keeping said elements locked together.

The front surface 16 of the ferrules and the surface of the sleeve 5 that surrounds the ferrules is lapped to ensure the perfect flatness and smoothness for the optical coupling.

In order to make the lapping operation of the front surface 16 of the ferrules easier, the sleeve 5 can be applied on the ferrules with its end axially displaced rearwardly with respect to the surface 16 so that it is not necessary to subject the sleeve 5 to the lapping operations.

A pin 17 is then force fitted in a corresponding groove 15 between the groove and the sleeve 5.

Suitably, the pin 17 is inserted in the groove 15 for more than a half of its length, and its projecting portion is inserted, when the two connectors are coupled, in the empty groove of the other connector. In this way, there is obtained a friction constraint which is considerably stronger where the inserted segment of the pin is longer. Therefore, when the two connectors are separated, each pin stays integral with the connector in which the pin is inserted for a greater length leaving the same connectors with an alignment pin and an empty groove and ready, without further operations, for a new connection with other similar connectors.

In order to increase the constraint of the pin 17 in its housing, it is possible to insert adhesive in the same housing, for example, by carrying out such insertion of adhesive in a through hole passage 22 (FIG. 2) or similar holes, extending between the recess 14 and the groove 15.

Two connectors, carried out and assembled in the abovementioned way, can be coupled together by introducing the corresponding pins in the corresponding grooves of the facing connector, keeping in contact the lapped coupling faces 16 and keeping the connectors tightened together after having carried out the mutual engagement of the teeth 18 of the ring nuts 8a and 8b which are axially pushed one against the other. In this condition, the springs 6 ensure a constant pressure between the faces 16 which assures the correct optical coupling.

Preferably, the ferrule elements 4a and 4b are made by pressing dimensionally stable plastic material, such as resins filled with mineral powders, thereby ensuring the desired precision and the identity of the pieces. The configuration of the ferrule elements is particularly suited to molding, because said ferrules are formed by elements which do not have through holes for housing the fibers. The fibers are housed in outwardly opening grooves, the impression of which, for the manufacture by molding, can be obtained with the desired precision.

The sleeve 5 is preferably made of a metallic material, for example, steel, brass or a similar material. In this way, the sleeve 5 can exert a tightening action on the ferrules and on the pin 17 thereby avoiding the problem that the force fitting on the pins 17 could stress the adhesive which secures the tapes 1 or 2 in the housing and causing the detachment of the ferrules from the tape after repeated connections and separations of the connectors.

Figure 7:
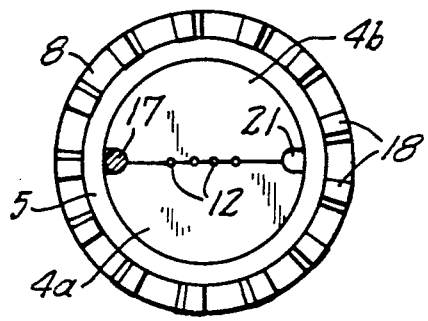
FIG. 7 is a cross-sectional view corresponding to the view of FIG. 4 but illustrating an alternative embodiment of the connector.

The configuration of the ferrules 4, where the grooves for the pins are arranged in a plane perpendicular to the separation plane between the ferrules and where the housings for the fibers are provided, allows the placement of a large number of fibers with a reduced outer size. For example, the connector can receive a tape with 10 fibers. When it is not necessary to house a large number of fibers, it is also possible to provide ferrules according to an alternative embodiment shown in FIG. 7 in which the housings 21 for the pins are in the plane of separation between the ferrule elements. This configuration limits, with the same outer size, the width of the fiber tape that can be housed, that is, the fiber number arranged on a single connector, but it maintains the desired coupling precision of about 1$\mu$m, only for the surface having the grooves for the fibers and the pins. Meanwhile, the precision desired for the remaining outer surface is reduced because it has only the function of supporting the sleeve 5 which tightens the ferrule elements. Therefore, this surface is easier to manufacture.

The connector structure according to the invention is therefore particularly convenient, both for its compact size, which allows the housing of a high number of connectors in a reduced volume, and for the simple assembly which it provides, requiring the assembling, in a sequence, of a reduced number of pieces for the application of a connector to the end of an optical fiber tape. Moreover, the described structure allows the avoidance, during the connection of the two connectors, of outer resilient elements for locking the connectors together because it is sufficient to engage the nut rings.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. A connector for interconnecting a pair of optical fiber tape cables, each cable comprising a plurality of optical fibers arranged parallel to each other and having a covering around all said fibers which is thin relative to its width, said connector comprising:

a ferrule comprising a pair of ferrule elements each of which has a length greater than its width and which is of semi-circular cross-section with a planar face extending lengthwise and axially of said ferrule and said elements being disposed with the planar face of one of said elements engaging the planar face of the other of said elements, one end of each of said elements having a coupling face for engagement with an element coupling face of a like connector and each of said elements having a plurality of parallel grooves in the planar face thereof for receiving and engaging individual ones of said optical fibers with said covering removed therefrom, said grooves extending from said coupling face axially of the element toward the opposite end of the element and the grooves of one element being aligned with the grooves of the other element when the planar face of said one element is in engagement with the planar face of said other element and each said element having a recess in said planar face thereof between the ends of said grooves remote from said coupling face and said opposite end of said element for receiving said optical fibers with said covering thereon, and each said element having at least one further groove extending from said coupling face toward said opposite end of the element for receiving an alignment pin and each further groove of one element being in alignment with the further groove of said other element when the planar face of one element is in engagement with the planar face of the other element;

a sleeve encircling said elements and holding them with the planar faces thereof in engagement, said sleeve having one end adjacent said coupling face and its opposite end intermediate said coupling face and said opposite end of said elements;

a ring nut encircling said sleeve and said elements and extending from adjacent said coupling face toward said opposite end of said elements, said ring nut being slidable axially with respect to said sleeve and said elements and having restraining means at the end thereof adjacent said coupling face for engagement with the restraining means of a like connector and for holding the first-mentioned said connector and said like connector together; and resilient means acting between said ring nut and said elements for urging said ring nut axially in the direction from said coupling face toward said opposite end of said elements and thereby urging the coupling faces of said elements toward the coupling faces of a like connector.

2. A connector as set forth in claim 1 further comprising an alignment pin in at least one said further groove and secured to said elements, said alignment pin extending outwardly from adjacent said coupling faces.

3. A connector as set forth in claim 2 wherein each said element has two said further grooves and wherein each said further groove has ann alignment pin therein and more than half of the length of each pin is within a further groove.

4. A connector as set forth in claim 2 wherein said pin is secured to said elements by an adhesive.

5. A connector as set forth in claim 4 wherein at least one of said ferrule elements has a hole extending from said recess to said further groove for supplying adhesive to said further groove.

6. A connector as set forth in claim 1 wherein each said further groove is disposed in a plane perpendicular to said planar face of an element.

7. A connector as set forth in claim 1 wherein each said further groove is disposed at said planar face of said elements.

8. A connector as set forth in claim 1 further comprising an adhesive in said recess for securing said tape to said elements.

9. A connector as set forth in claim 8 wherein at least one of said ferrule elements has a hole extending from the exterior of said one ferrule element to said recess for supplying adhesive to said recess.

10. A connector as set forth in claim 1 wherein said resilient means is a helical spring interposed between said ring nut and said elements.

11. A connector as set forth in claim 1 wherein said restraining means is a plurality of axially extending teeth with undercut portions for receiving and engaging teeth of a like connector.

12. A connector as set forth in claim 1 wherein said elements are made of a dimensionally stable plastic material.

13. A connector as set forth in claim 1 wherein said sleeve is made of metal.

14. A connector as set forth in claim 1 wherein said one end of said sleeve is axially set back from said coupling face in the direction from said coupling face toward said opposite end of said elements.

* * * * *